Feb. 25, 1941.     W. BAUMGÄRTNER     2,233,238
ROLL FILM CAMERA
Filed July 8, 1938     4 Sheets-Sheet 4

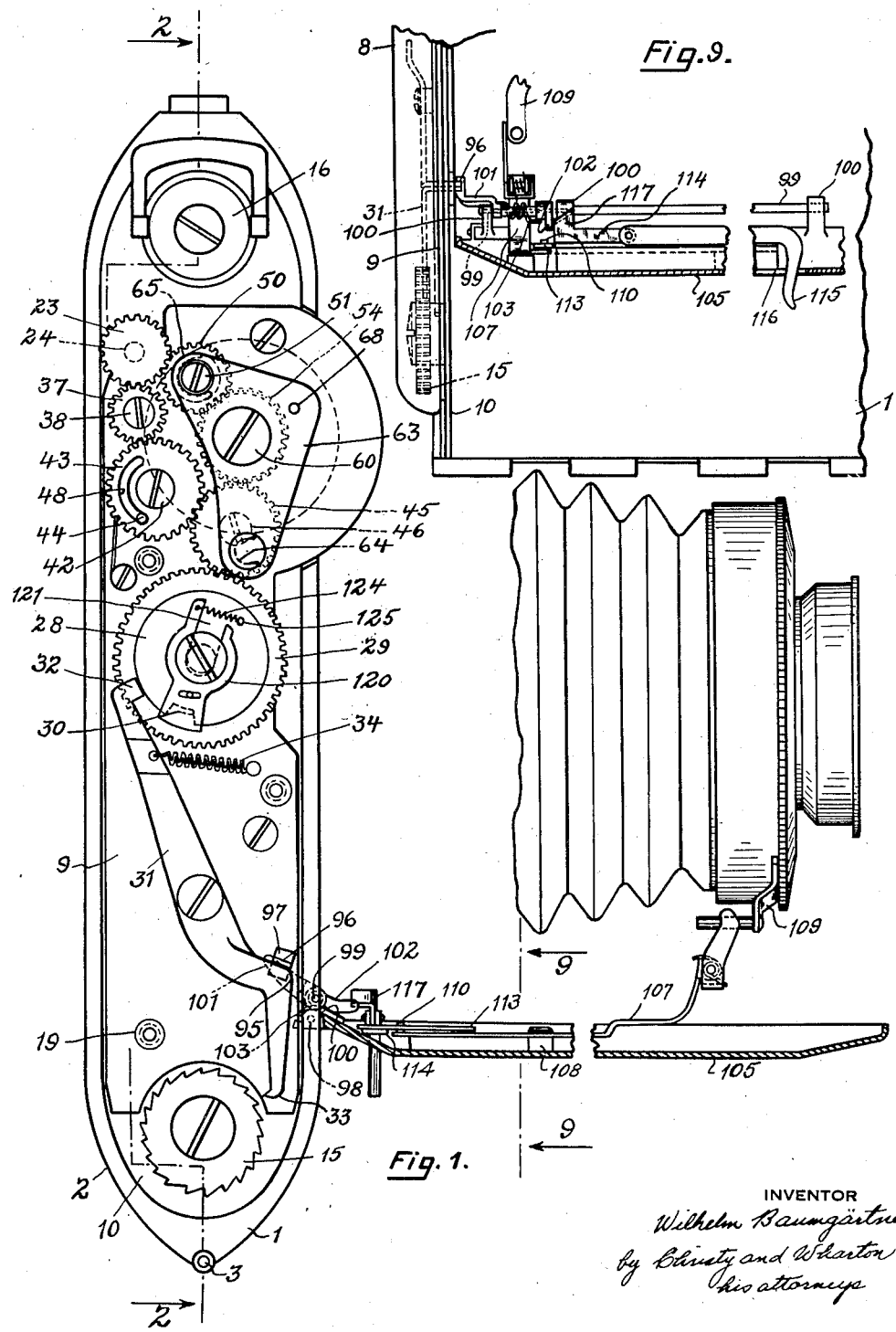

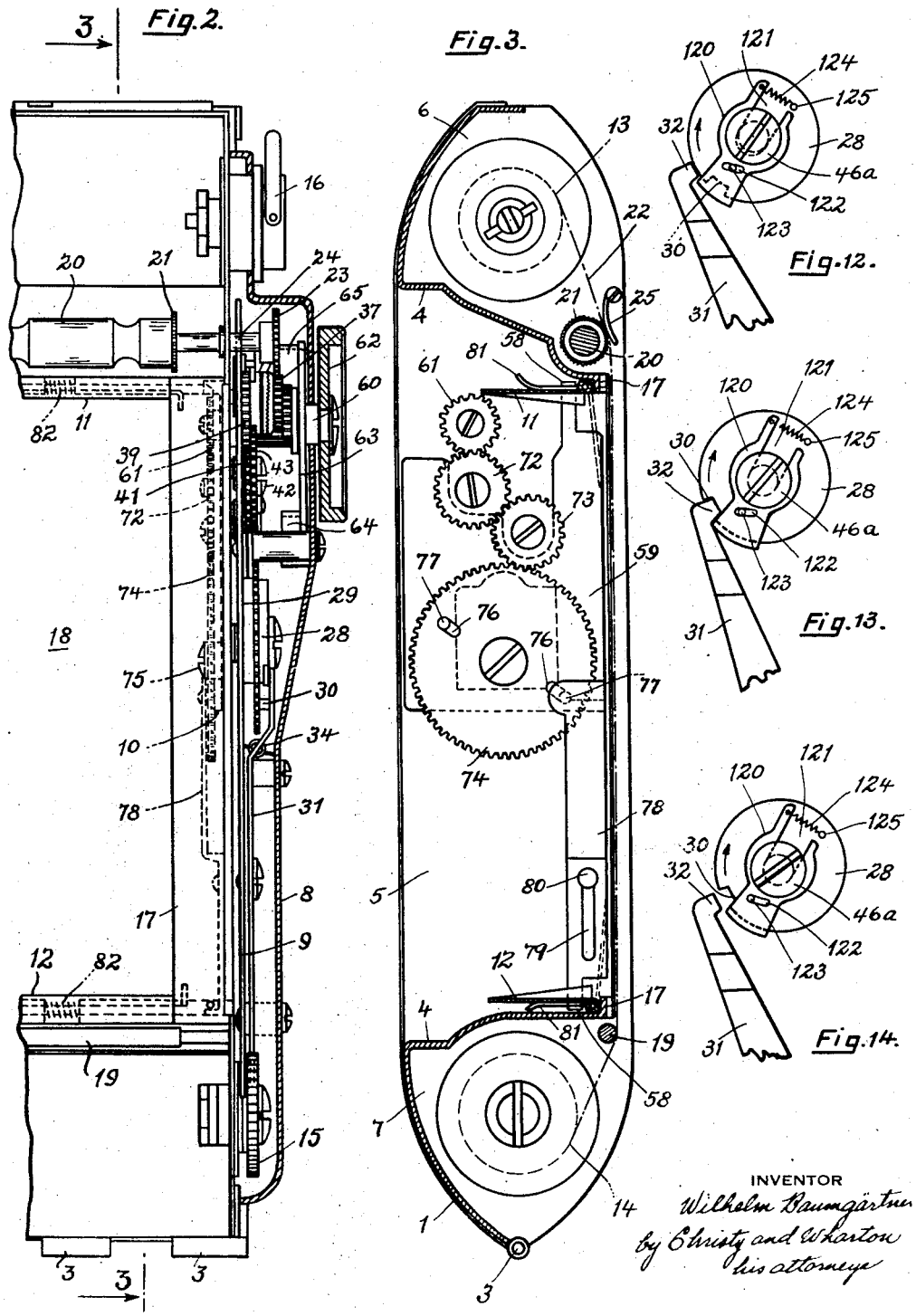

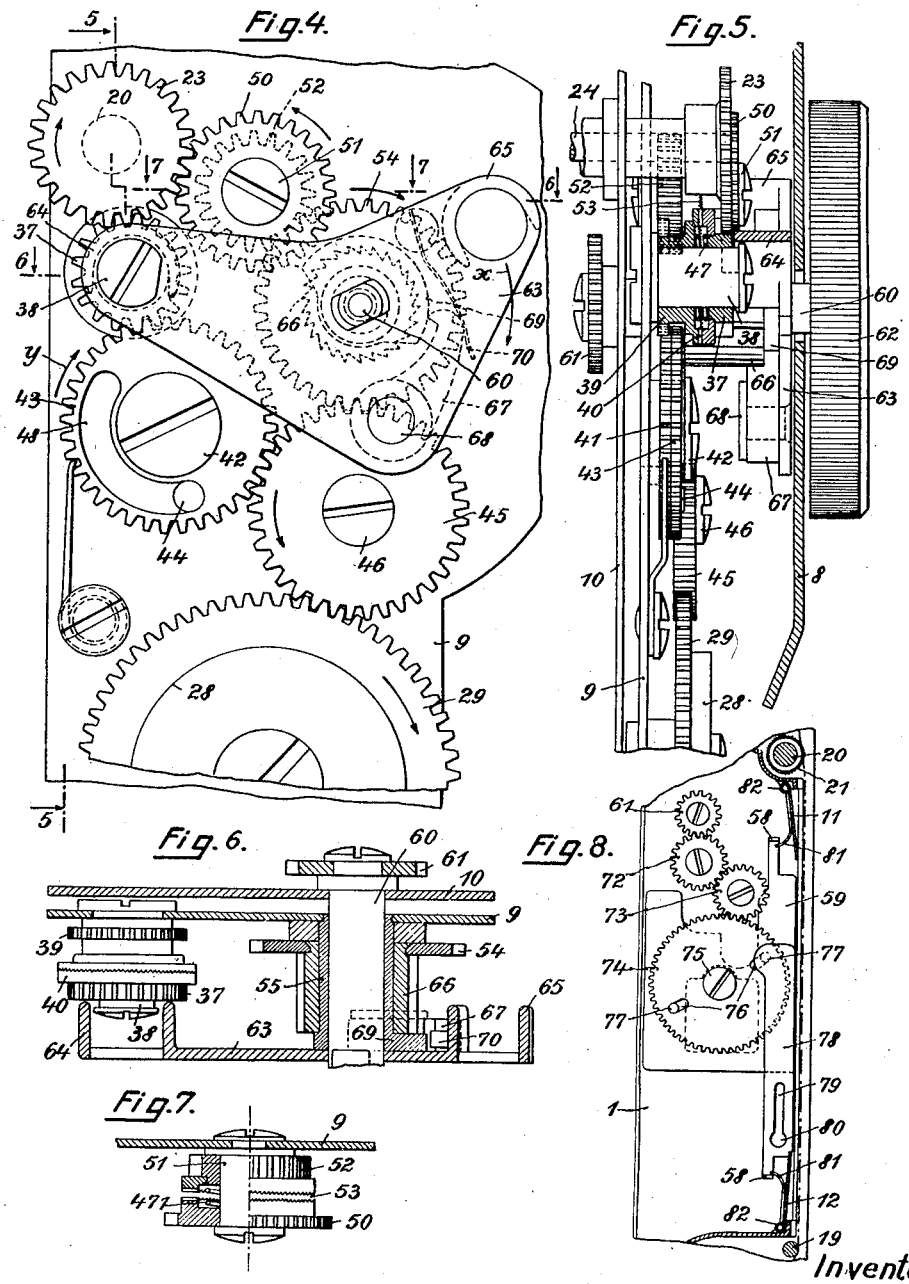

Inventor
Wilhelm Baumgärtner
By Franz Reinhold.
Attorney

Patented Feb. 25, 1941

2,233,238

UNITED STATES PATENT OFFICE 2,233,238

ROLL FILM CAMERA

Wilhelm Baumgärtner, Brunswick, Germany, assignor, by mesne assignments, to Sherka Chemical Co. Inc., Bloomfield, N. J., a corporation Application July 8, 1938, Serial No. 218,175
In Germany October 9, 1936

9 Claims. (Cl. 95—32)

My invention relates to improvements in roll film cameras, and more particularly in roll film cameras of the type in which film feeding mechanism is provided which may be selectively set for feeding film sections of large size and small size, so that large size and small size exposures may be made. One of the objects of the improvements is to provide film feeding mechanism of this type in which loss of a certain length of film is avoided when the said film feeding mechanism is changed from the position for making large size exposures to the position for making small size exposures or vice versa. With this object in view my invention consists in providing means operative when the film feeding mechanism is changed from one position to the other for compensating for the irregularity in the position of the exposed film section resulting from the previous film feeding operation.

Other objects of the improvements will appear from the following description.

Figure 10:
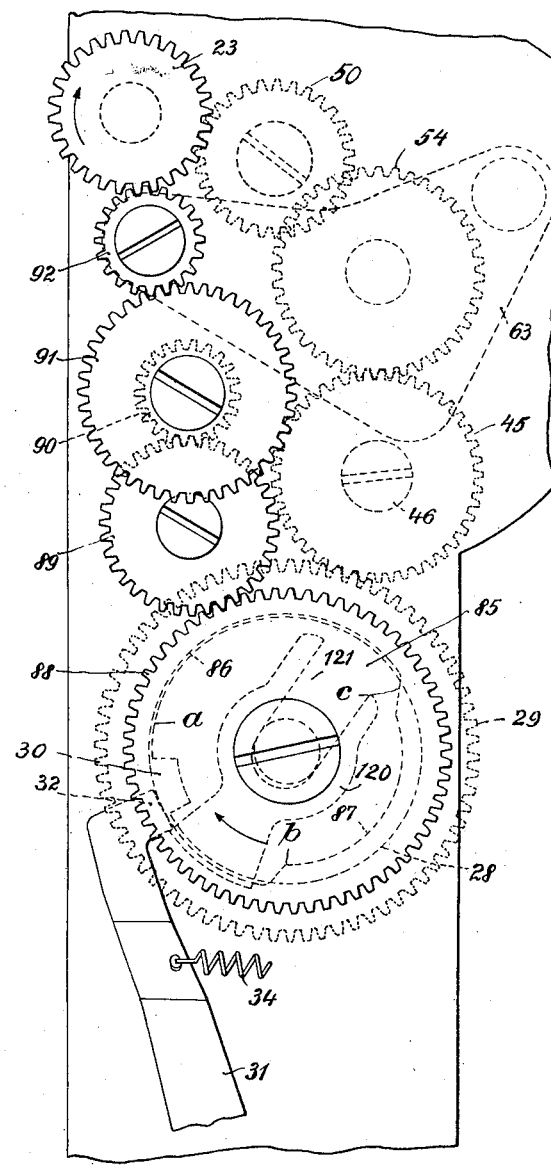
Figure 11:
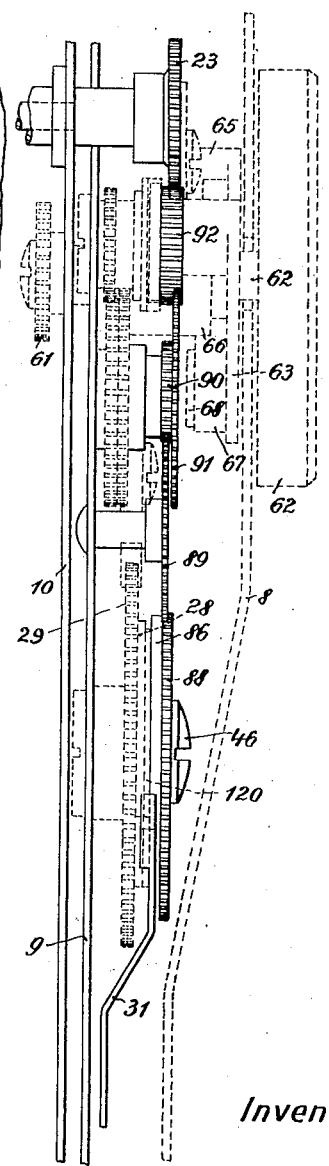

For the purpose of explaining the invention several examples embodying the same have been shown in the accompanying drawings, in which the same reference characters have been used in all the views to indicate corresponding parts. In said drawings, Fig. 1 is a side elevation of the camera with the casing enclosing the film controlling mechanism removed, Fig. 2 is a sectional elevation taken on the line 2—2 of Fig. 1, Fig. 3 is a sectional elevation taken on the line 3—3 of Fig. 2, Fig. 4 is an elevation on an enlarged scale showing the trains of gear wheels illustrated in Fig. 1, the member controlling the said trains of gear wheels being shown in a different position, Fig. 5 is a sectional elevation taken on the line 5—5 of Fig. 4, Fig. 6 is a sectional plan view taken on the line 6—6 of Fig. 4, Fig. 7 is a sectional plan view taken on the line 7—7 of Fig. 4, Fig 8 is a sectional elevation similar to the one illustrated in Fig. 3 and showing the masks controlling the exposure opening in a different position, Fig. 9 is a sectional elevation taken on the line 9—9 of Fig. 1, Fig. 10 is an elevation on an enlarged scale and similar to the one illustrated in Fig. 4 and showing a modification, Fig. 11 is a side elevation of Fig. 10, and Figs. 12 to 14 are elevations showing a detail used in either one of the cameras shown in Figs. 1, 9, 10 and 11.

In the example shown in Figs. 1 to 9 the camera comprises a body 1 having a lid 2 hinged to its rear side at 3 and formed with an inwardly pressed portion 4 forming an exposure chamber 5 and film spool chambers 6 and 7, the portion 4 being formed with a flange 17 providing an exposure opening 18. At one side a casing 8 is fixed to the body 1, which encloses the film controlling gearing, and within the said casing a plate 9 is secured to the end wall 10 of the body. To the flanges 17 upper and lower masks 11 and 12 are hinged by means of which the size of the exposure opening may be reduced, as is shown in Fig. 8. Within the upper chamber 6 a film winding spool 13 and within the lower chamber 7 a film delivering spool 14 is mounted. The film winding spool 13 is provided with the usual key 16, and the film delivering spool has a ratchet-wheel 15 secured to its shaft, the said ratchet-wheel being located outside the side wall 10 of the body 1 and within the casing 8. Within the lower chamber 7 a film guide rod 19, and within the upper chamber 6 a friction roller 20 are mounted, the said friction roller being formed near its ends with teeth 21 frictionally engaging the film 22 trained thereon, springs 26 being provided for pressing the film into engagement with the said teeth. To the outer end of the shaft 24 of the friction roller 20 a gear wheel 23 is secured which forms a part of the film controlling mechanism. The shaft 24 is passed through and guided in the said plate 9.

On the said plate 9 the film controlling mechanism is mounted, which comprises, in addition to the gear wheel 23, a film measuring disk 28 connected with a coaxial gear wheel 29 and formed with a notch 30, a lever 31 formed at its top end with a nose 32 cooperating with the said notch and at its bottom end with a nose 33 cooperating with the ratchet wheel 15, a spring 34 tending to hold the nose 32 in engagement with the disk 28 and to throw the nose 33 into locking engagement with the ratchet wheel 15. Normally the said lever 31 is in the position shown in Fig. 1 in which it engages with its nose 32 the unnotched portion of the periphery of the disk 28, while its nose 33 is out of engagement with the ratchet disk 15. But when the nose 32 is in line with the notch 30 the spring 34 turns the lever 31 with its nose 33 into locking engagement with the ratchet disk 15, for interrupting the film feeding operation by means of the key 16, as will be described hereafter. The disk 28 with its gear wheel 29 slightly projects at the margin through a slot made in the side wall of the casing 8, so that it may be turned by the finger of the photographer.

The gear wheel 23 is adapted to be connected with the film measuring disk 28 and its gear wheel 29 through either one of two trains of gear wheels of different gear ratios one corresponding to films of small size say 6 by 6 centimeters and the other one to films of large size say 6 by 9 centimeters. The first train of gear wheels comprises a gear wheel 37 which is rotatably mounted on a pivot bolt 38 secured to the plate 9 and meshing with the gear wheel 23, a gear wheel 39 loosely mounted on the said pivot bolt 38 and adapted to be connected with the gear wheel 37 by coupling teeth 40, a gear wheel 41 loosely mounted on a pivot bolt 42 and meshing with the gear wheel 39, a gear wheel 43 loosely mounted on the said pivot bolt 42 and formed with a segmental slot 48 engaged by a pin 44 secured to the gear wheel 41, and a gear wheel 45 loosely mounted on a pivot bolt 46 and meshing with the gear wheels 43 and 29. Between the gear wheels 37 and 39 a coiled spring 47 is located which tends to hold the said gear wheels out of locking engagement with each other.

The second train of gear wheels comprises a gear wheel 50 loosely mounted on a pivot bolt 51 fixed to the plate 9, a gear wheel 52 loosely mounted on the said pivot bolt 51 and adapted to be coupled with the gear wheel 50 by means of teeth 53, and a gear wheel 54 loosely mounted on a tubular pivot bolt 55 and meshing with the said gear wheel 52 and the gear wheel 45. Normally the teeth 53 are held out of engagement by a spring 471.

Within the tubular pivot bolt 55 a shaft 60 is rotatably mounted which carries at its inner end a gear wheel 61 and at its outer end a milled disk 62. Within the casing 8 the said shaft has a controlling member in the form of a substantially triangular disk 63 fixed thereto, and the said disk carries segmental cam members 64 and 65 which are adapted to engage respectively the gear wheels 37 and 50 for shifting the same inwardly and with their teeth 40 and 53 in coupling engagement, Fig. 4 showing the controlling member 63 in the position in which the cam member 64 engages the gear wheel 37 so as to couple the same with the gear wheel 39, and Fig. 1 showing the controlling member 63 in the position in which its cam member 65 engages the gear wheel 50 and couples the same with the gear wheel 52.

On the tubular pivot bolt 55 a ratchet wheel 66 is loosely mounted which is fixed to the gear wheel 54, and which is adapted for engagement with a pawl 67 mounted on a pivot bolt 68 fixed to the controlling disk 63. The outer end of the tubular pivot bolt 55 is made integral with a cam disk 69 having a segmental portion of large diameter and a segmental portion of smaller diameter. The pawl 67 is acted upon by a leaf spring 70 tending to press the same into engagement with the segmental portion of larger diameter of the disk 69, and when the controlling member 63 is turned from the position shown in Fig. 4 and in the position shown in Fig. 1, in which the pawl 67 is opposite to the portion of smaller diameter of the cam disk, the said pawl engages in the teeth of the ratchet disk 66.

The gear wheel 61 is connected through a train of gear wheels 72 and 73 with a gear wheel 74 mounted on a pivot bolt 75 and formed with radial slots 76. The said slots are engaged by pins 77 fixed one to a link 78 guided with a slot 79 on a pin 80, and the other one to a slide 59. The said link 78 and slide 59 are formed with laterally projecting fingers 58 adapted to engage arms 81 connected with the masks 11 and 12, and when the wheel 74 is turned in a direction for shifting the link 78 upwardly and the slide 59 downwardly the masks 11 and 12 are turned into the positions shown in Fig. 8 in which they cover the top and bottom parts of the exposure opening 18, so that small size images are produced on the film. When the disk 74 is turned in the opposite direction the link 78 and slide 59 release the masks 11, whereupon the said masks are automatically turned by springs 82 into the horizontal positions shown in Fig. 3 in which the exposure opening is unobstructed and full size pictures are produced.

The lever 31 is adapted to be retracted from the disk 28 by mechanism connected with the shutter release mechanism. As shown, the downwardly directed arm of the lever is formed with a knee 95 which is formed with a finger 96 projecting through a slot 97 in the plate 9 and the side wall of the body 1 into the said body. The base board 105 is hinged to the body 1 at 98, and near the said hinge a shaft 99 is pivotally mounted on the base board at 100. To the said shaft arms 101 and 102 are fixed, and the arm 101 is held by a spring 103 in engagement with the said finger 96, while the arm 102 is in engagement with a slide 114 forming a part of the shutter releasing mechanism mounted on the base board 105. The said mechanism comprises a lever 107 extending longitudinally of the base board and pivotally mounted thereon at 108, the said lever engaging the shutter release lever 109. A pin 110 secured to the rear or inner end of the said lever 107 has pin and slot connection with an arm 113 connected with the slide 114. This slide is transversely slidable on the base board and it is provided with a finger piece 115 projecting through a slot 116 made in the base board. At its rear end the slide 114 is formed with an upwardly directed sheet metal finger 117 which is inclined upwardly and laterally of the base board.

In the position of the parts shown in Figs. 1 and 9 in full lines in which the lever 31 is out of locking engagement with the ratchet disk 15, the arm 102 is in the path of the said finger 117, and therefore the slide 114 and the shutter release mechanism are locked. When, however, the lever 31 is thrown into locking engagement with the ratchet disk 15 the finger 96 turns the arms 101 and 102 anticlockwise (Fig. 1), so that the arm 102 releases the finger 117 and the slide 114, and the release mechanism may be operated. When the finger 117 is then moved to the left in Fig. 9 the arm 102 rides on the inclined face of the said finger upwardly, and thereafter it is again turned downwardly by the spring 103 to a position to the rear of the finger. When the slide 114 is released it is shifted to the right in Fig. 9, and the inclined bottom face of the finger 117 turns the arm 102 further downwardly. Therefore the arm 101 turns the lever 31 anticlockwise and retracts the same with its nose 32 out of the notch 30 and with its nose 33 out of engagement with the ratchet disk 15. The nose 32 is retracted away from the disk 28 somewhat beyond the circumference thereof, and when the finger 117 releases the lever 102 the lever 31 is turned by its spring 34 towards the disk 28 so far that the arm 102 is slightly moved upwardly and into position for engaging the lower edge of the finger 117 and for locking the shutter release mechanism.

On the disk 28 a plate 120 is rockingly mounted which is adapted to cover the notch 30 for temporarily preventing the nose 32 from engaging the said notch. This plate and its function will be described hereafter with reference to Figs. 12 and 13.

The operation of the film feeding device is as follows:

The rear wall 2 of the body 1 is opened, a full film spool 14 is placed into the chamber 7, the film backing paper is passed on the guide rod 19, across the exposure opening 18 and on the friction roller 20 and fixed to the empty film winding spool 13. The film controlling mechanism is first made inoperative by turning the controlling member 63 by means of the milled disk 62 into an intermediate position in which its cam members 64 and 65 are out of engagement with the gear wheels 37 and 50 and the said gear wheels are disconnected respectively from the gear wheels 39 and 52. The film winding key 16 is turned for winding a part of the film backing paper on the spool 13, the camera is closed, and the key is further turned until the first section of the film is in position at the rear of the exposure opening 18, in which position the number 1 is visible through the usual red window. The disk 28 is set by hand into initial position corresponding to the number 1 of the film. In this position the nose 32 of lever 31 engages the notch 30 of the disk 28, and the nose 33 engages the ratchet wheel 15 thus locking the film delivering spool.

It may be assumed that at first a full size exposure is to be made, the image having a size of say 6 by 9 centimeters. Therefore the controlling member 63 is now brought into the position shown in Figs. 1 to 3 in which it couples the gear wheels 50 and 52. The shutter mechanism is now released for taking a photograph, because the lever 31 is in the position in which its nose 32 engages the notch 30 and the arm 102 has been turned upwardly. After operation of the shutter release mechanism the lever 31 is retracted from the notch 30 and the ratchet disk 15 and the film delivering spool 14 are released, as has been described above.

Now the key 16 is turned for winding the exposed section of the film on the film winding spool 13 and setting the next film section into position for exposure. The film carries along the roller 20 by friction, and the rotary movement thus imparted to the friction roller is transmitted through the train of gear wheels 23, 50, 52, 54, 45 and 29 to the measuring disk 28, the gear ratio of the said train of gear wheels being such that the lever 31 engages the notch 30 and the ratchet wheel 15 when the next section of the film is in exposure position. Thus the film delivering spool 14 is locked and further rotary movement of the key 16 is impossible.

By the aforesaid movement of the controlling member 63 into position for coupling the gear wheels 50 and 52 the disk 74 has been set through the intermediary of the gear wheels 61, 72 and 73 into the position shown in Fig. 3 in which the masks 11 and 12 are away from the exposure opening 18. Thus the full size of the exposure opening is open, and a full size picture is made on the film.

If it is desired to change from a full size exposure to a picture of smaller size, the controlling member 63 is turned from the position shown in Figs. 1 to 3 into the position shown in Fig. 4 in which the train of gear wheels 23, 50, 52, 54, 45 is interrupted between the gear wheels 50 and 52, and the train of gear wheels 23, 37, 39, 41, 43 and 45 is closed by the coupling teeth 40. Thus, when the key 16 is again operated for feeding the film through a length corresponding to a small size exposure, e. g. 6 centimeters, the lever 31 engages the notch 30 of the disk 28 and the ratchet wheel 15 after a length of film corresponding to a small size exposure has been fed. However, by the previous operation corresponding to a full size exposure the corresponding full size section of the film has been brought into exposure position, and therefore it is necessary by the first feeding movement of the film to impart an additional feed to the film so as to remove the said full size section of the film which before has been exposed from the exposure opening, and for this purpose the film must receive an additional feed equal to one-half of the difference between the lengths of the full size and small size film sections that is in the example of pictures of 6 by 9 and 6 by 6 centimeters, 1½ centimeter. The transmission gearing permits such additional feed of the film by reason of the pin and slot connection 48, 44 between the gear wheels 41 and 43. By reason of this pin and slot connection the rotary movement imparted to the gear wheel 23 by the film is transmitted at the beginning only to the pin 44 which travels through the segmental slot 48 to the end thereof, whereupon the further movement is transmitted through the gear wheels 43, 45 and 29 to the disk 28.

If the next exposure is to be made on a small size section of the film the rotary movement imparted by the film to the gear wheel 23 is transmitted to the disk 28 from the beginning of the film feeding movement, because the pin 44 is already at the leading end of the slot 48 and there is no lost motion. Thus the film delivering spool 14 is locked by the lever 31 at the end of the small size feed of the film.

If it is desired to change the camera from a small size exposure to a full size exposure the controlling member 63 is again turned into the position for throwing the train of gear wheels 23, 50, 52, 54, 45 into operation. Now the rear end of the previously exposed film section is in advance of the rear edge of the full size exposure opening by one-half of the difference of the lengths of the large and small size pictures, and if now the film were fed a length equal to the length of a full size picture there would be a loss of film. Therefore the next film feed is reduced by an amount equal to one-half of the difference between the lengths of the large and small size pictures. For this purpose the controlling member 63 is turned from the position shown in Fig. 4 in the direction of the arrow x. Thereby the pawl 67 leaves the portion of large diameter of the cam disk 69, and it gets into engagement with the ratchet disk 66. Thus the gear wheel 54 is turned in clockwise direction and such movement is transmitted to the gear wheel 45 which imparts a certain lead to the notch 30 relatively to the nose 32 of the lever 31. Finally the pawl 67 engages again the portion of large radius of the cam disk 69 and it is thus retracted from the ratchet disk 66.

The rotary movement of the gear wheel 45 is also transmitted to the gear wheel 43 which is thereby turned in the direction of the arrow y. Thus the trailing end of the slot 48 gets into position for engagement with the pin 44, and if thereafter the film controlling mechanism is again changed to small size exposures, the gear wheels 41, 43 have a certain lost motion, as has been explained above.

In Figs. 10 and 11 I have shown a modification in which in addition to the controlling mechanism described with reference to Figs. 1 to 9 a device is provided for holding the lever 31 in non-locking position relatively to the ratchet wheel 15 while the leading and tail ends of the film backing paper are being wound on the film winding spool 13. The said device consists of a cam disk 85 mounted coaxially of the disk 28 and having a segmental portion 86 of large diameter and a segmental portion 87 of smaller diameter, the nose 32 of the lever 31 having a breadth such as to engage not only the disk 28 but also the cam disk 85. The said cam disk 85 is connected with a gear wheel 88 which is connected through a train of gear wheels 89, 90, 91 and 92 with the gear wheel 23. Thus the rotary movement imparted by the film to the said gear wheel 23 is always transmitted to the disk 85, independently of the position of the controlling member 63.

The dimensions of the cam faces of the disk 85 are such that the portion a—b corresponds to the length of the leading end of the backing paper, the portion b—c to the total length of the film and the length c—a to the length of the tail end of the backing paper.

When a new film is inserted the nose 32 engages the cam disk 85 at the point a, and therefore the lever 31 is held out of engagement with the ratchet wheel 15 when the film winding spool is turned for winding the leading end of the film backing paper thereon and for pulling the first section of the film into exposure position. The nose 32 rides on the portion a—b and thereafter it gets into position radially of the said point b. Therefore, during the following film feeding operations the lever 31 is controlled by the disk 28, as has been described above. After the whole length of the film has passed the exposure opening the point c is in position for engagement with the nose 32, and thereafter, while the tail end of the film backing paper is being wound on the film winding spool the section c—a of the disk 85 holds the lever 31 out of locking engagement with the ratchet wheel 15.

As far as the function of the disk 85 is concerned it is immaterial whether full size or small size photographs are being taken.

As has been described above, the nose 32 of the lever 31 gets into engagement with the notch 30 when an unexposed film section is in exposure position, and when the shutter releasing mechanism is operated for making an exposure the nose 32 is retracted. When thereafter the said mechanism is released and the slide 114 returns into initial position the nose 32 would engage again in the notch 30, because the disk 28 has not been moved, and therefore it would be impossible to feed the exposure film. Therefore means must be provided for temporarily preventing the nose 32 from engaging in the notch, and for this purpose the aforesaid disk 120 is provided, which disk has been shown in different positions in Figs. 12 to 14.

As is shown in Figs. 10 and 11 the said disk is located between the disk 28 and the cam disk 85, and it is formed with a bifurcated portion 121 straddling the pivot bolt 46a. Further, the disk is formed with a slot 122 engaging a pin 123 fixed to the disk 28. To one arm of the bifurcated portion 121 a spring 124 is attached which is connected with its opposite end to a pin 125 secured to the disk 28. The slot 122 is disposed angularly of the circumference of the disk 28 in such a way that the disk 120 is slightly moved inwardly and towards the pivot bolt 26 when it is turned anti-clockwise. The outer edge of the disk 120 slightly projects beyond the disk 28 and the cam portion of the disk 85.

When the disk 28 has been rotated by the film being fed so far that its notch 30 is near the nose 32 and into the position shown in Fig. 12 its notch 30 is covered by the disk 120. The disk 120 is engaged and arrested by the nose 32, because it slightly projects beyond the circumference of the disk 28. The disk 28 is further rotated, and the notch 30 is uncovered so that the nose 32 engages the same (Fig. 13). When the exposure is made the lever 31 is retracted from the notch by the finger 117 of the slide 114 so far that it releases the disk 120, which is turned by its spring 124 in clockwise direction, and into the initial position in which it covers the notch 30. When the shutter releasing mechanism is released the lever 31 is turned by the spring 34 into engagement with the circumference of the disk 28. But it can not engage the notch 30, because it is arrested by the disk 120. Therefore the film can be further advanced for winding the exposed film on its spool and bringing the next film section into exposure position.

As long as the cam portion 86 of the disk 85 cooperates with the notch 30 of the disk 28 the lever 31 can not engage the notch 30. But whenever the disk 120 gets into position for engagement by the nose 32 it is arrested while the disk 28 continues its rotary movement. But the relative movement of the disks 28 and 120 is limited by the slot 122 and the pin 123. In order to prevent locking of the disk 28 by the engagement of the disk 120 with the nose 32 the slot 122 is disposed at an angle such that the disk 120 is moved towards the pivot bolt 26 and with its outer portion away from the nose 32, so that it is released from the said nose and permits further movement of the disk 28.

I claim:

1. A roll film camera, comprising film feeding mechanism, and mechanism controlling the length of film being fed, said controlling mechanism including means adapted to interrupt the film feeding operation, a member operating said controlling mechanism and movable proportionally to the film being fed, two selectively operative transmission gears of different gear ratios intermediate said member and means and severally adapted to throw said means into operation for making large size and small size exposures, means for bringing said transmission gears alternately into power-transmitting connection between said member and said means, and means operative when the said transmission is changed from one gear to the other for compensating for the irregularity in the position of the exposed film section resulting from the previous film feeding operation.

2. A roll film camera as claimed in claim 1, in which the transmission gear which is operative when pictures of small size are made has two different gear ratios one operative when the transmission has been changed from large size exposures to small size exposures and the other one operative when also the previous exposure was a small size exposure.

3. A roll film camera as claimed in claim 1, in which the transmission gear which is operative when pictures of small size are made has cooperating driving and driven members having lost motion, the driven one of said members being operatively connected with the transmission gear for pictures of larger size.

4. A roll film camera as claimed in claim 1, in which said compensating means comprise a device operative when the transmission is changed from small size exposures to large size exposures for imparting compensating movement to said interrupting means in the direction for throwing the interrupting means into operation.

5. A roll film camera, comprising film feeding mechanism, and mechanism controlling the length of film being fed, said controlling mechanism including means adapted to interrupt the film feeding operation, a member operating said controlling mechanism and movable proportionally to the film being fed, two selectively operative transmission gears of different gear ratios intermediate said member and means and each adapted to throw said means into operation for making large size and small size exposures, a hand operated member for throwing either one of said transmission gears into operation, and pawl and ratchet mechanism connected with said hand operated member and operative when the said gears are changed from small size exposures to large size exposures for imparting compensating movement to said interrupting means in the direction for throwing the interrupting means into operation.

6. A roll film camera as claimed in claim 5, comprising a cam disk controlling the operation of said pawl and ratchet mechanism and shaped so that the pawl and ratchet mechanism is operative when said hand operated member is out of engagement with said gears.

7. In a roll film camera including film-carrying and film-feeding mechanism adapted to advance a reach of film in extended plane from one to the other of two rolls, the invention herein described which consists of a latch adapted to engage and release said film-feeding mechanism, a control for said latch, two lines of power transmission adapted to be brought alternately into position to be operated by the advancing film and to impart to the latch-control movement at different rates relatively to the rate of film advance, a mask movable between an inoperative position and a position overlying in part the reach of film extended in a plane, and means for simultaneously moving said mask between the two positions named and for bringing one line of power transmission to operative position in alternation with the other.

8. In a roll film camera comprising film-feeding mechanism, and mechanism controlling the length of film being fed, said controlling mechanism including means adapted to interrupt the film-feeding operation, a rotary member operating said control mechanism and rotating proportionately to the film being fed, two selectively operative transmission gears of different gear ratios intermediate said member and means and severally adapted to throw said means into operation for making large-size and small-size exposures, means for bringing said transmission gears alternately into power-transmitting connection between said member and said means, and a cam disk rotatable in response to and in co-ordination with the rotation of said operating member for holding said interrupting means out of interrupting position, said holding mechanism being operative when the leading and tail ends of the film-backing paper is being fed and inoperative when the film is being fed across the exposure opening of the camera.

9. In a roll film camera that includes a film-winding spool, a film-delivering spool having a ratchet-wheel secured to its shaft, a lever adapted to be swung to and from a position of engagement with said ratchet wheel, and a spring engaging said lever and tending to swing said lever and to hold it in ratchet-engaging position, the invention herein described of means for controlling the position of said lever, such means including a notched disk and a cam disk mounted for independent rotation upon a common axis, the cam disk having a high portion of its periphery of a radius not less than the unnotched portion of the notched disk and a low portion of its periphery of a radius less than the unnotched portion of the notched disk, and the said lever being adapted to make abutment under the tension of its spring upon the peripheries of the two said disks, means for effecting one rotation of the notched disk in response to the advance of the film through the space interval between successive exposures, and means for effecting one rotation of the cam disk with the advance of the entire length of film and backing paper, the parts being so arranged that the lever is held in inactive position during the winding upon the film-winding spool of the leading end of the backing paper and thereafter is free to swing in response to the advance of the notched disk.

WILHELM BAUMGÄRTNER.